United States Patent [19]

Tranbarger

[11] 4,289,722
[45] Sep. 15, 1981

[54] METHOD OF POTTING MAGNETIC SPEED PICKUPS

[75] Inventor: Glen E. Tranbarger, Anderson, Ind.

[73] Assignee: General Motors Corporation, Detroit, Mich.

[21] Appl. No.: 173,031

[22] Filed: Jul. 28, 1980

[51] Int. Cl.³ .............................................. B29C 6/02
[52] U.S. Cl. ................................... 264/102; 264/272;
264/236; 264/272.13; 264/272.16
[58] Field of Search .............. 264/102, 272, 236, 347;
324/174

[56] References Cited

U.S. PATENT DOCUMENTS 3,693,252 9/1972 Robertson et al. ............ 264/272.17
3,710,437 1/1973 Kipple et al. ................... 264/272.20
4,045,738 8/1977 Buzzell ................................ 324/174

*Primary Examiner*—James B. Lowe
*Attorney, Agent, or Firm*—Mark A. Navarre

[57] ABSTRACT

A potting process for a magnetic speed pickup including elements subject to substantial thermal expansion and contraction, wherein each step of the potting process is performed at an elevated temperature corresponding to the highest expected temperature for a given application. As a result, adequate spacing is provided between the various pickup elements to accommodate for thermal expansion and contraction of the elements when the pickup is used in a thermally variant environment.

3 Claims, 3 Drawing Figures

METHOD OF POTTING MAGNETIC SPEED PICKUPS

This application relates to a method of potting magnetic speed pickups of the type disclosed in co-pending U.S. patent application Ser. No. 096,770, filed Nov. 23, 1979 and assigned to the assignee of the present invention. In particular, this invention relates to a method of potting such a pickup for use in high temperature environments.

Speed pickups are generally subjected to a potting process following assembly wherein the pickup is placed in an evacuated container and a resinous substance such as epoxy is introduced into one end of the pickup. The epoxy impregnates all spaces between the pickup elements and thereafter is cured so that the various pickup elements will not dislodge when the pickup is used in a harsh or vibrational environment.

In high temperature applications (300° F. or higher), it has been found that pickups incorporating polymer bonded barium-ferrite magnets (plastic magnets) have a tendency to fail due to the large thermal expansion of such magnets, as compared to ALNICO magnets. While other elements of the pickup assembly also thermally expand and contract, their variations are generally not considered to be detrimental. However, when the plastic magnet thermally expands against the cured epoxy resin, the resulting stress tends to crack the epoxy and dislodge various pickup elements, contributing to a failure.

Accordingly, it is an object of this invention to provide an improved method of potting a magnetic speed pickup incorporating a thermally expandable magnet whereby the resulting pickup may be reliably operated in a high temperature environment.

It is a further object of this invention to provide an improved method for potting a plastic magnet speed pickup wherein the magnet and other pickup elements are free to expand and contract within the pickup housing.

It is a further object of this invention to provide an improved method for potting a plastic magnet speed pickup wherein adequate spacing is maintained within the pickup assembly to accommodate for thermal expansion and contraction of the magnet and other pickup elements when the pickup is operated in a thermally cyclic environment.

These objects are carried forward by performing the potting process at a temperature equal to or greater than the highest expected temperature for a given application (use temperature). Specifically, this process comprises the steps of (1) preheating the pickup assembly to a temperature equal to or exceeding the use temperature, (2) introducing a heated epoxy mixture into the pickup assembly, (3) evacuating an area around the pickup assembly to completely impregnate the assembly with epoxy and (4) curing (solidifying) the epoxy at a temperature equal to or higher than the use temperature. As the pickup cools following the curing of the epoxy, the plastic magnet within the pickup contracts, leaving an air gap in the volume that was occupied by the magnet in the expanded condition. As a result, a pickup potted in accordance with this process retains the advantages of epoxy impregnation while allowing the plastic magnet (as well as the other pickup elements) to harmlessly expand and contract as a function of the temperature of the operating environment.

IN THE DRAWINGS

Figure 1:
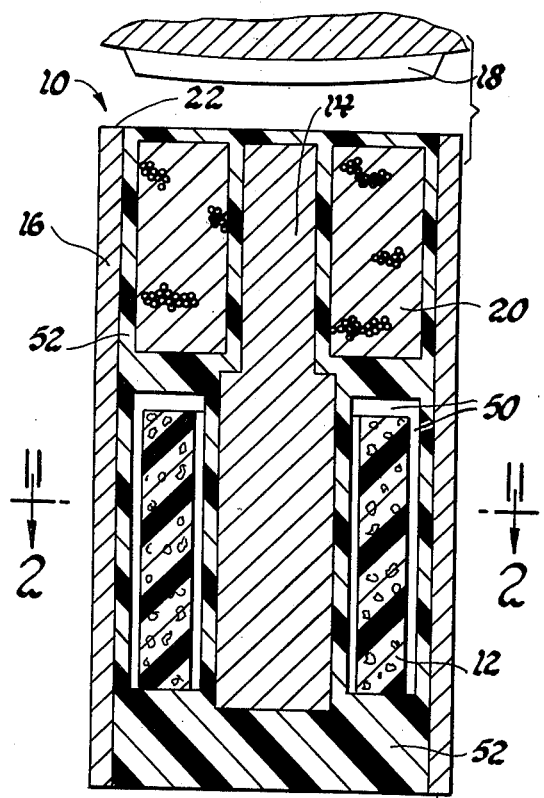
FIG. 1 is a sectional view of a magnetic pickup made in accordance with this invention.
Figure 2:
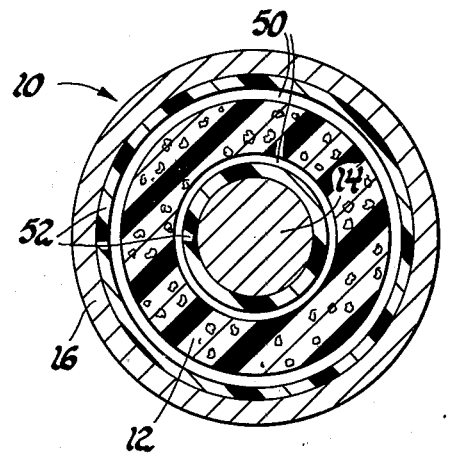
FIG. 2 is a cross-section taken along lines 2—2 of FIG. 1.

Referring now to FIGS. 1 and 2, reference numeral 10 generally designates a magnetic speed pickup comprising annular radially magnetized barium-ferrite magnet 12, inner pole piece 14, outer pole piece 16, and coil 20. Magnet 12 cooperates with inner pole piece 14, outer pole piece 16, and a rotating gear tooth 18 to form a variable reluctance magnetic circuit around coil 20. It will be understood that an alternating current electrical signal is thereby induced in coil 20, the frequency of the signal being directly proportional to the rotational speed of gear tooth 18. The pickup elements are manually assembled within outer pole piece 16 which serves as the pickup housing, and then the pickup assembly is potted in accordance with the potting process outlined by the flow diagram of FIG. 2. It will be appreciated that FIGS. 1 and 2 are somewhat abbreviated for the sake of clarity in disclosing the potting method of this invention, and that according to the preferred embodiment, the pickup assembly is like the one illustrated in the above-referenced application.

Figure 3:
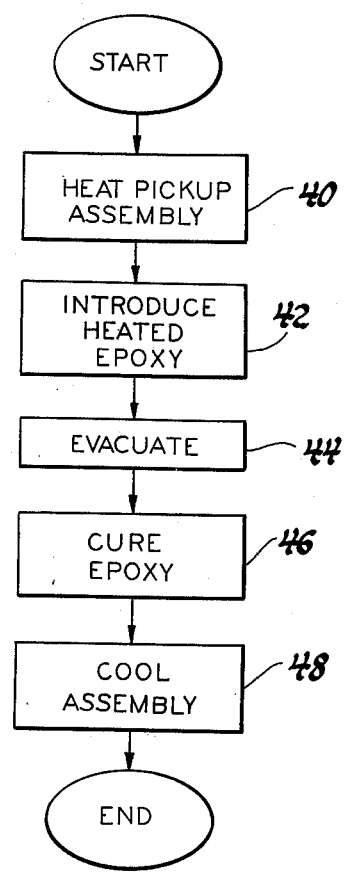
FIG. 3 is a flow diagram illustrating the potting process of this invention.

Referring now to FIG. 3, it will be seen that once the pickup is assembled, the first step of the potting process, as designated by reference numeral 40, is to heat the pickup assembly in an oven or other heated enclosure to a temperature at least as high as the use temperature. In doing so, the various pickup elements (particularly magnet 12) are caused to thermally expand. Then the pickup assembly is stood on end 22 and a preheated mixture of epoxy resin and hardener is poured into end 24, as designated by reference numeral 42. Then the pickup assembly is evacuated in a vacuum chamber as designated by reference numeral 44, to draw air bubbles out of the pickup assembly and thereby completely impregnate with epoxy all of the spaces in and around the pickup elements. Following impregnation, the pickup assembly is placed in an oven and maintained at a temperature that equals or exceeds the use temperature in order to cure (solidify) the epoxy, as designated by reference numeral 46. It will be noted that during this step the pickup elements are maintained in their thermally expanded condition since the entire pickup assembly is maintained at the higher temperature. After the epoxy has cured, the pickup assembly is cooled, as designated by reference numeral 48. Upon cooling, the pickup elements thermally contract, leaving spaces in the cured epoxy that correspond to the difference in their expanded and contracted volumes.

The completed pickup assembly illustrated in FIGS. 1 and 2 is depicted at a temperature less than that of the use temperature. As such, the pickup elements (especially magnet 12) have contracted, leaving spaces 50 between themselves and the cured epoxy, which is generally designated by reference numeral 52. It will be appreciated that for the purpose of illustration, spaces 50 have been somewhat exaggerated. When the pickup assembly is subsequently heated up to the use temperature, the pickup elements expand to either partially or completely fill the spaces 50. Thus, a pickup assembly potted in accordance with this invention has the advantages that epoxy impregnation affords and at the same time it is capable of reliable operation in a thermally variant environment in which the various pickup elements thermally expand and contract to a substantial degree.

Althrough it will be apparent that a variety of impregnating materials may be used in successfully practicing this invention, the material preferably comprises a suitable mixture of a Bisphenol-A/Epichlorohydrin-based epoxy resin and a catalyzed anhydride hardener. Also, the temperature of the epoxy mixture upon introduction into the pickup assembly may be varied somewhat depending upon the viscosity and gelling speed desired. According to the preferred embodiment, the use temperature is approximately 300° F. The pickup assembly and the epoxy mixture are heated to approximately 300° F., and following impregnation, the epoxy is cured to a solid mass at a similar temperature for $3\frac{1}{2}$ hours.

Although the potting process of this invention has been described in reference to a specific magnetic speed pickup, it will be appreciated that it may be applied to other assemblies equally as well. It will also be appreciated that various modifications may be made to the described process without departing from the scope of this invention, one such modification being the reversal of one or more of the process steps.

The embodiments of the invention in which an exclusive property or privilege is claimed are defined as follows:

1. A method of potting a magnetic pickup assembly that comprises a housing containing a permanent magnet of a type that thermally expands with increasing temperature comprising the steps of:

heating the pickup assembly to a temperature that causes thermal expansion of the permanent magnet;

introducing a resinous material into said housing;

evacuating the pickup assembly so that said resinous material impregnates the spaces surrounding said permanent magnet;

curing said resinous material by maintaining the temperature of the material at a predetermined value for a period of time sufficient to solidify said material; and cooling said assembly to permit said permanent magnet to contract, whereby adequate spacing is provided within said pickup assembly to accommodate for thermal expansion and contraction of said permanent magnet.

2. A method of potting a magnetic pickup assembly that comprises a housing containing a plastic magnet comprising the steps of:

heating the pickup assembly to a temperature that equals or exceeds the use temperature for the intended pickup application;

introducing a resinous material into said housing;

evacuating the pickup assembly so that said resinous material impregnates the spaces surrounding said magnet;

curing said resinous material by maintaining the temperature of the assembly at or higher than said use temperature for a period of time sufficient to solidify said material; and cooling said assembly to permit said magnet to contract, whereby adequate spacing is provided within said pickup assembly to accommodate for thermal expansion and contraction of said magnet.

3. A method of potting a magnetic pickup assembly that comprises a housing containing a polymer bonded barium-ferrite magnet comprising the steps of:

heating the pickup assembly to a temperature that equals or exceeds the use temperature for the intended pickup application;

introducing a heated resinous material comprising epoxy resin and hardener into said housing;

evacuating the pickup assembly so that said resinous material impregnates the spaces surrounding said magnet;

curing said resinous material by maintaining the temperature of the pickup assembly at or higher than said use temperature for a period of time sufficient to solidify said material; and cooling said assembly to permit said magnet to contract, whereby adequate spacing is provided within said pickup assembly to accommodate for thermal expansion and contraction of said magnet.

* * * * *